United States Pat

Robinson

[11] 3,655,989
[45] Apr. 11, 1972

[54] RADIATION SENSITIVE STRIP WIDTH MEASURING UNIT AND SPLIT EDGE DETECTOR

[72] Inventor: Robert W. Robinson, Bedford, England
[73] Assignee: British Steel Corporation, London, England
[22] Filed: July 6, 1970
[21] Appl. No.: 52,430

[52] U.S. Cl. ............... 250/219 WD, 250/219 DF, 250/227, 356/159
[51] Int. Cl. .................................................. G01b 7/04
[58] Field of Search ............ 250/219 DF, 219 WD, 227, 210, 250/206; 356/237, 238, 199, 200, 159; 350/96 B

[56] References Cited

UNITED STATES PATENTS

| 3,365,699 | 1/1968 | Foster | 250/219 X WD |
| 3,311,749 | 3/1967 | Briggs | 356/159 |
| 3,255,357 | 6/1966 | Kapany et al. | 250/219 X |
| 3,480,786 | 11/1969 | Kottman | 250/219 DF |
| 3,560,096 | 2/1971 | Watson et al. | 250/219 X DF |
| 2,680,200 | 6/1954 | Hercock | 250/219 X DF |
| 2,510,347 | 6/1950 | Perkins | 356/159 |

*Primary Examiner*—Walter Stolwein
*Attorney*—Mason, Kolehmainen, Rathburn & Wyss

[57] ABSTRACT

A strip monitoring apparatus and more particularly to apparatus for continuous precision measuring of the width of a strip and for detecting faults, such as splits in the edge of the strip. The apparatus for monitoring a strip comprises a light source, at least one light guide member for conducting light from said light source to a surface in the area of an edge of a strip of material, a corresponding guide member arranged to receive light from said one guide member and means for recording and interpreting light received from said corresponding guide member.

9 Claims, 3 Drawing Figures

Patented April 11, 1972
3,655,989
2 Sheets-Sheet 1
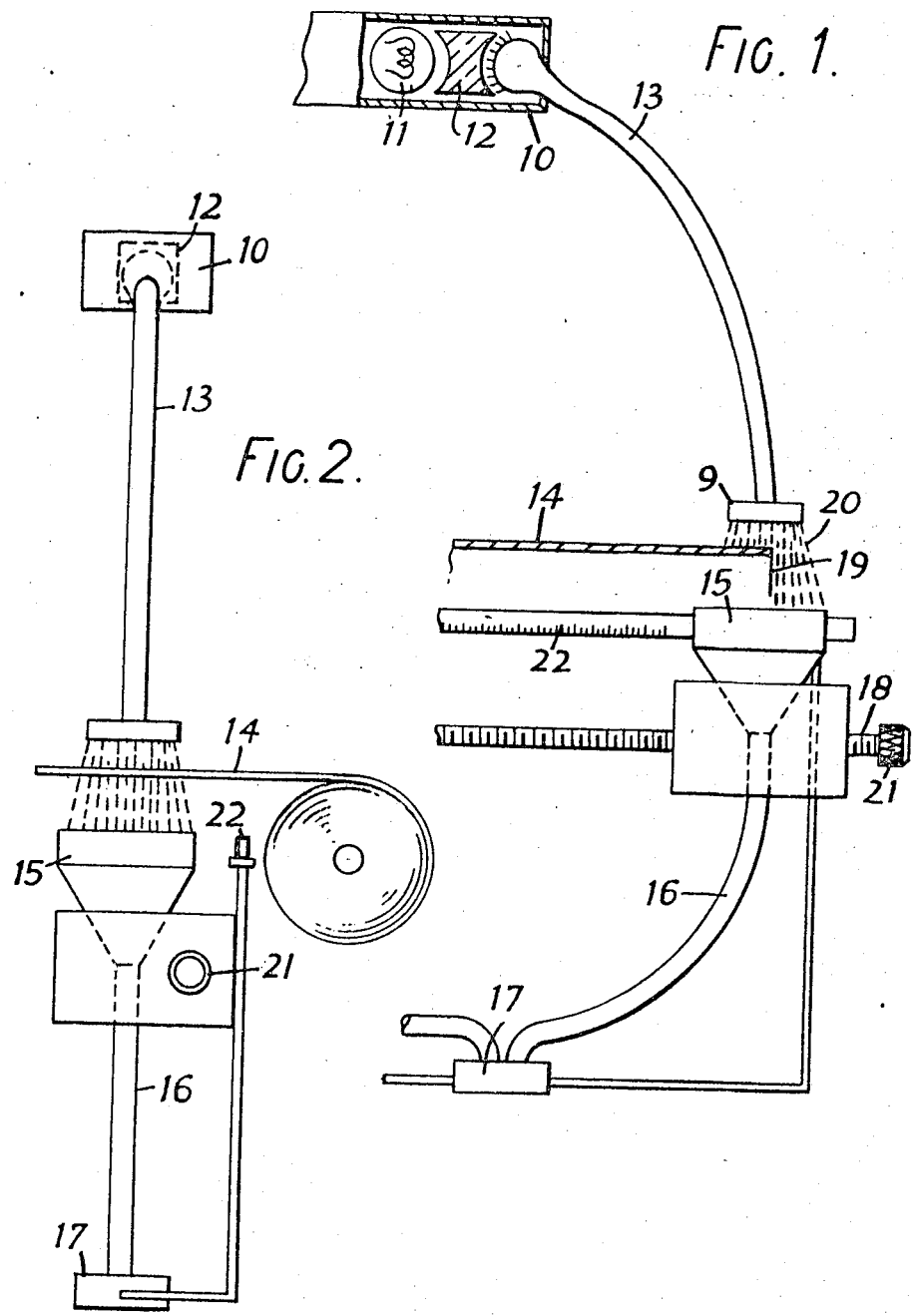
INVENTOR:
ROBERT WILFRED ROBINSON,
BY: Mason, Kolehmainen, Rathburn & Wyss,
ATTORNEYS.

INVENTOR:
ROBERT WILFRED ROBINSON,
BY: Mason, Kolehmainen, Rathburn & Wyss,
ATTORNEYS.

RADIATION SENSITIVE STRIP WIDTH MEASURING UNIT AND SPLIT EDGE DETECTOR

The present invention relates to strip monitoring apparatus and more particularly to apparatus for continuous precision measuring of the width of a strip and for detecting faults, such as splits in the edge of the strip.

The invention has particular application for use in the production of, for example steel, aluminum, brass, paper or any material in strip form, which may be wound on a roll, processed under tension.

In the production of material that is produced under tension and would in a roll, it is advantageous to include means for measuring the width of the material as it is produced so that it conforms to a specified width and at the same time to provide means for checking the condition of the edges of the material. This latter requirement is especially necessary in steel making where the resultant strip can have small cracks at the edges which are detrimental to a finished product.

In the case of strip, users require a strip of specified width so that in turn the users processes and controls can work from a reliably accurate datum. For example, where strip material is blanked out it is clear that the blanks can go very much closer to the edge of the material leaving minimum waste if the width of the strip throughout its length has a close tolerance. However, where the width varies, blanks produced from such a strip close to the edge may extend beyond the edge to produce unsuitable blanks. Hitherto there has been a considerable waste of material supplied in excess by the manufacturer of strip to his financial disadvantage in that he has to provide excess width in order to make sure that the width of the strip is not less than the minimum specified.

Optical lens methods of strip width monitoring or control have been proposed, particularly for one width of strip. The mechanical complications or re-orientating a plurality of lenses so as to cater for the monitoring of different strip widths has been unsatisfactory since this requires extremely accurate mechanical adjustment which may be possible in a laboratory but is not desirable in a production environment. Moreover a lens system which is required to operate in an environment of heat and dirt is unlikely to produce the accuracy of monitoring since dirt may build up on the lens system and lead to simulate a change of strip width which is false. With such a system at speeds say, for example, 5,000 ft. per minute, accurate width monitoring or control has not been satisfactorily achieved. Optical lens methods suffer from inaccuracies due to changes in the intensity of ambient light and require an amplifier system to give sufficient signal to provide readable indications on a meter. Also, optical lens systems require the blocking out of ambient light which is difficult in a production environment and the incorporation of an amplifier which suffers from drift.

According to the present invention there is provided apparatus for monitoring a strip comprising a light source, at least one guide member for conducting light from the light source to the surface in the area of an edge of material strip of 2.625 a corresponding guide member arranged to receive light from the guide member for conducting light and means for recording and interpreting the light received.

In a preferred embodiment of the invention these guide members are disposed at both edges of the strip.

Preferably, the guide members are in the form of fibre members, such as non-coherent fiber optics, which are made up of light conductors in the form of a bundle, and conduct light from one point to another, and by virtue of their very small diameters are flexible to permit for flexible lateral adjustment of the position of the transmitting and receiving parts of the guide members, preferably by a linear transducer which records the exact distance that the light transmitting and receiving parts of the guide members are set apart. Alternatively, a shaft encoder may be used when large tolerances are possible.

According to a further feature of the invention a light source is provided to detect a condition where the edges of the strip to be monitored are damaged or cracked. Preferably this is provided by a cathode-ray tube connected into the electrical system of the apparatus whereby when a crack or split is detected the wave form shows an increase in amplitude, and this may subsequently initiate a warning signal.

An embodiment of the invention will now be described by way of example with reference to the accompanying drawings in which:

FIG. 1 is a diagram of a portion of a strip monitoring apparatus, while

FIG. 2 is a side elevation of the apparatus of FIG. 1,

Figure 3:
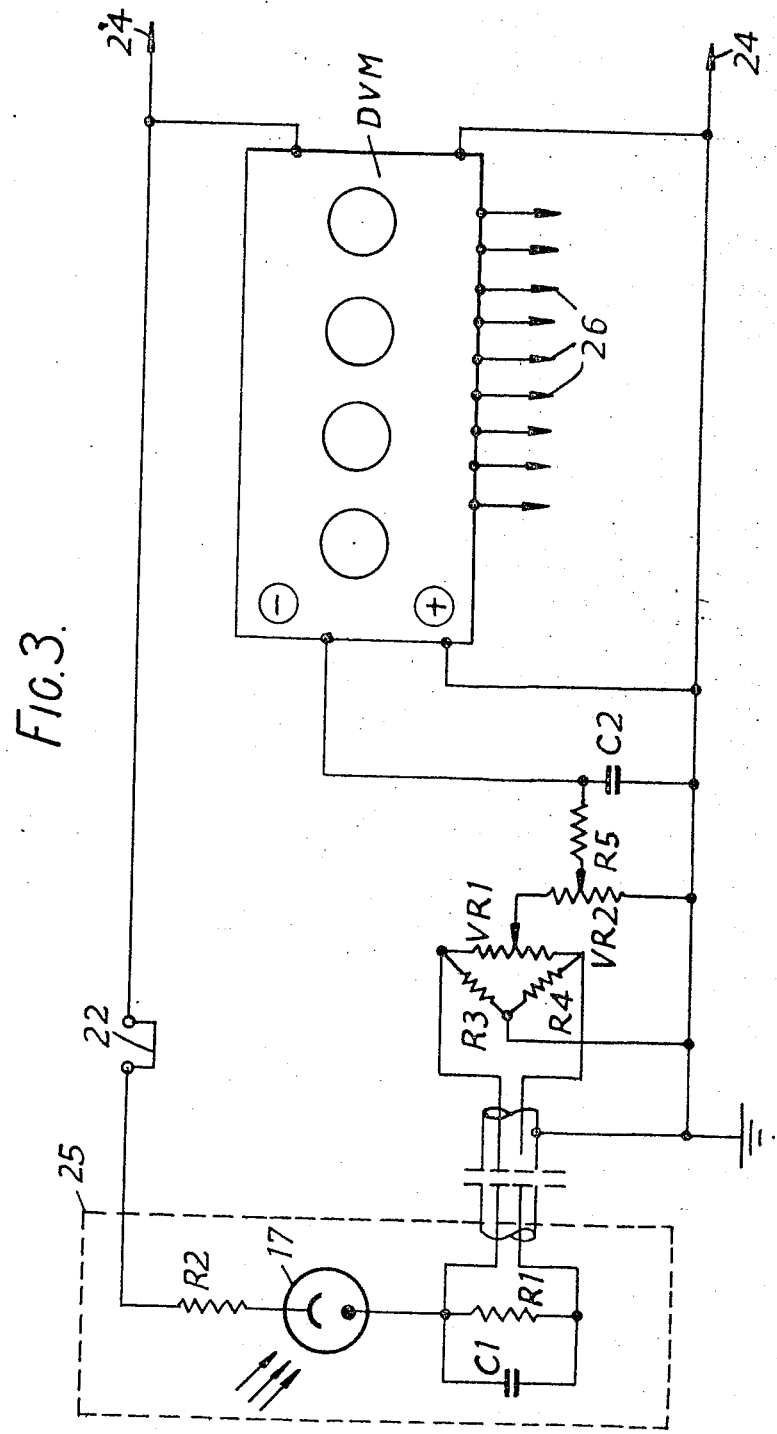
FIG. 3 shows an electrical circuit.

Referring to FIGS. 1 and 2 of the drawings, an outer framework shown in part at 10 carries a source of light comprising a lamp unit 11 and a pair of lens, one of which is shown at 12, arranged to concentrate the light from the lamp unit 11 on to one end 9 of a pair of fiber optic guide members, one of which is shown at 13. The guide members 13 in turn conduct the light to a position where it can be wholly or partially obstructed by one edge of a moving strip of material 14 which is to be monitored and wholly or partially received by a rectangular head member 15. The light received by the member 15 is transmitted by further or second fibre optic guide members, as shown at 16, to a photo-electric cell or photometer 17, where its intensity is measured.

The rectangular head members 15 are laterally adjustable by means of a lead screw 18.

The guide members 13 and 16 are composed of non-coherent Fibre light conductors of small diameters and in the form of a bundle. "Noncoherent" fiber light conductors are fiber light conductors which are not ordered systematically and which are not capable of transmitting an optical image. The light output of a "noncoherent" fiber light conductor usually diffuse and reveals the average intensity of light which is incident upon the bundle.

The ends of the guide members 13 may be fitted with square or rectangular heads disposed opposite to and in alignment with the rectangular heads 15 for receiving the light. By means of the lead screw 18 the rectangular heads 15 can be finely adjusted beneath the edges 19 of the moving strip 14, so as to allow the strip 14 in its normal or neutral position to obstruct half a light beam 20 issuing from the Fibre optic guide members 13. If this condition is considered the normal condition, then any increase or decrease in the width of the strip 14 as it moves beneath the light beam 20 will vary the intensity of the light received at the photo-electric cell or photometer 17. Lateral movement of the strip 14 will not effect this factor since by such movement the intensity of one beam will be reduced and the other increases so that the actual intensity of light received by the photoelectric cell or photometer will not change.

The lead screw 18 may be manually operated by a knob 21, alternatively, gearing may be fitted whereby the movement of the rectangular heads 15 can be synchronised with the first guide members 13. The carriages of the second set of light guides 16 are attached to a linear transducer 22 which may be capable of measuring to say, 1/10,000 parts of an inch.

As the guides are moved the transducer records the exact distance between the two heads of each set and this distance is electrically indicated on an auto set digital read-out, not shown. For example, for producing a strip of "MATERIAL say 0).'0% inch wide an adjustment is provided indirectly by gearing, or directly manually to drive the lead screw until the required distance between the heads is indicated in the digital read-out window. The apparatus is then ready for use.

The photo-electric cell or photometer 17 is coupled to a detector, such as a digital volt meter, and when the strip 14 is the correct width the digital volt meter will indicate zero deviation. Any variation of the width will permit light in small or great quantities to be projected into the photometer, therefore the digital volt meter will record increases or decrease in the width of the strip from its set position and in addition will generate a binary coded signal for correcting such deviations.

The same light source may be used for detecting the condition which is known by steel makers as a split edge, which means that the strip can have small cracks at the edge which is detrimental to the finished product. To detect such a condition a cathode-ray tube is mounted on the operators console and connected into the electrical circuit of the photometer. When a crack occurs the wave form shown by the cathode-ray tube has a marked increase in amplitude and this can operate a light to initiate such condition to the operator so that the sheet can be marked where this occurs.

FIG. 3 shows a circuit which provides immunity to parasitic transients and thermal stability. In the circuit the photo-electric cell 17 is of a highly stable and sensitive vacuum type. The photo-electric cell current is reduced to a safe working value by a resistor R2 and its magnitude can be checked by removing test link 22 and inserting an ammeter (not shown). A load resistor R1 is shunted by a condensor C1 to bypass any alternating current residuals and to provide working time constant of the combination. The resistors R1 and R2 are preferably special high stability resistors and the photo-electric cell 17 supply is fed from a highly stabilized power pack through the contacts 24. To minimize any stray pick ups the main components of the apparatus are fully floating as indicated at 25.

On receiving light the photo-electric cell 17 current passes through the resistor R1 and the developed potential difference across it is transmitted by the coaxial line to a bridge (not shown). The resistors R2 and R3 provide the arms of the bridge and a variable resistor VR1 enables the bridge to be set to zero in order to provide for adjustment of static balance.

Any difference in light received from the guide members puts the bridge out of balance and the positive, or negative going potential difference is fed via a variable resistor VR2 and a resistor R5 directly to a digital volt meter DVM.

The brilliance of light and the sensitivity control are so adjusted that the potential difference of 1 millivolt is displayed by the digital volt meter DVM as one-thousanth part of an inch.

The resistor R5 and the condensor C2 form a parasitics stopper net work. If the measured strip deviates from the zero or required size the difference as displayed by the digital volt meter DVM indicates by a minus sign that the strip is narrower than required or by a plus sign that the strip is wider than required. For example, when the digital volt meter DVM displays +0.017 this means that the strip is seventeen-thousands of an inch wider than required. Any measure of correction is taken from the binary code output and logic of the digital volt meter DVM as indicated by the arrows 26.

The use of fiber optics has the advantage that no amplifiers are required for clear meter indications of variations in width and they reject most of the ambient light surrounding them. In other words, light guides have a high signal to noise ratio.

I claim:

1. Apparatus for monitoring the width of a material strip comprising:

a light source;

two transmitting light guide members formed from non-coherent bundles of light conducting fibers which optically connect to said light source and which conduct light from said light source to an end of each transmitting light guide member;

a light transmitting head connected to the end of each transmitting light guide member;

a path over which said material strip is to be passed, said path having two edges;

means for moving said light transmitting heads and for positioning said heads at opposite edges of the path over which said material strip is to be passed;

light sensitive means for measuring and for indicating the quantity of light received;

two receiving light guide members formed from non-coherent bundles of light conducting fibers which optically connect to said light sensitive means and which conduct light from an end of each receiving light guide member to said light sensitive means;

a receiving head connected to the end of each receiving light guide member and positioned opposite a transmitting head;

means for passing said material strip along said path so as to intercept a portion of said light; and means for providing relative motion between said material strip and said light guide members;

whereby deviation in the width of said material strip is indicated by said light sensitive means according to the level of light interception, and whereby sidewise motions of said strip do not substantially alter the indication of said light sensitive means.

2. Apparatus according to claim 1, wherein said receiving heads are rectangular and arranged to extend in a plane parallel to the plane of a material strip passing through said apparatus.

3. Apparatus according to claim 1, wherein said means for recording light received comprises a photometer.

4. Apparatus according to claim 3, wherein said photometer includes a digital read out.

5. Apparatus according to claim 4, wherein said photometer is capable of receiving a signal from a null balance position to provide a signal without the use of amplifiers.

6. Apparatus according to claim 3, and further including a feed back loop whereby an indication on said photometer provides corrective control for cutting and setting the width of said material strip.

7. Apparatus according to claim 4, to which is added a feed back loop whereby an indication on said photometer provides corrective control for cutting and setting the width of a strip of material.

8. Apparatus according to claim 3 and including an oscilloscope fitted in a circuit of said photometer.

9. Apparatus according to claim 1, which includes a cathode-ray tube in a circuit in the light sensitive means.

* * * * *